United States Patent Office 3,270,808
Patented Sept. 6, 1966

3,270,808
METHOD FOR INCREASING SUBTERRANEAN FORMATION PERMEABILITY
Robert R. Harvey, Bartlesville, Okla., assignor to Phillips Petroleum Company, a corporation of Delaware
No Drawing. Filed Feb. 25, 1963, Ser. No. 260,864
6 Claims. (Cl. 166—9)

This invention relates to a method for increasing the water permeability of a subterranean formation. In one aspect the invention is related to the art of recovering hydrocarbon from underground formations. More specifically it relates to an improved waterflood procedure.

The use of water injection in secondary recovery of petroleum is wide spread. In a waterflood operation, water is injected through one or more input wells causing the oil to be displaced from the formation surrounding the input wells. This oil travels at the head of the waterflood front from the formations surrounding the input to the output well from which the oil is produced in the usual manner. In such secondary recovery operations it is necessary that large volumes of water be injected into the oil bearing formation at reasonable heads. In the primary production of oil it is also sometimes necessary to dispose of large quantities of brine produced with the oil. In disposing of such brine by injection into a subterranean formation it is again necessary that the input well handle large volumes of fluid at reasonable pressures.

Mechanical clean-out, acid treatment and solvents have been used with varying degrees of success for increasing the input of flood water and brine into the formation. The first two of these methods are generally effective but the labor and cost involved and the loss of input time in the well while it is being serviced make these methods expensive. Chemical additives such as sodium carbonate, surface active agents and the like have been added but these additives have not been used extensively primarily due to difficulty experienced in selecting the proper additive for a specific formation.

It is an object of the invention to provide an improved method for increasing the water permeability of a subterranean formation.

It is another object of the invention to provide an improved method for the recovery of hydrocarbon oil from underground formations. It is yet another object of the invention to provide an improved method for water flooding an oil bearing formation.

These and other objects of the invention will be readily apparent to those skilled in the art from a reading of the accompanying disclosures and claims.

These objects are broadly accomplished by the employment of an additive selected from the groups consisting of:

(A)

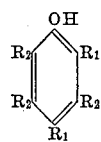

where $R_1$ and $R_2$ are selected from the group consisting of H, OH, R', $R_3$OH, COOH and $R_3$COOH, at least one $R_1$ being OH,
R' is an alkyl group having 1 to 4 carbon atoms per molecule, and $R_3$ is an alkylene group having 1 to 3 carbon atoms per molecule;

(B)

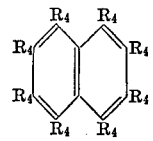

where $R_4$ is selected from the group consisting of H, OH, R', $R_3$OH, COOH, and $R_3$COOH, at least two $R_4$'s being OH and said structure being oxidizable to a quinone;

(C) flavotannins;
(D) gallotannins;
(E) mixed tannins;
(F) quinhydrone;
(G) p-benzoquinone;
(H) 1-naphthol;
(I) 1,3-naphthalenediol;
(J) phloroglucinol and 2-methylphloroglucinol, and
(K) mixtures thereof.

Although a wide variety of compounds are suitable for increasing the water wettability of the oil formation, the following compounds are included in the above identified groups.

Group A.—Pyrocatechol, pyrogallol, gallic acid, hydroquinone, 1,2,4-benzenetriol, 2,5-xylohydroquinone, 3-butylpyrocatechol, 4-isopropylpyrocatechol, 2,3-dihydroxybenzyl alcohol, 3 - (2,5-dihydroxy-m-tolyl)-1-propanol, (2,5-dihydroxyphenyl)acetic acid, 4-(3,4-dihydroxyphenyl)butyric acid and the like.

Group B.—1,7-naphthalenediol, 2,3 - naphthalenediol, 1,5-naphthalenediol, 2,6-naphthalenediol, 2 - methyl-1,7-naphthalenediol, 1-butyl-2,3-naphthalenediol, 1,2,5-naphthalenetriol, 1-isopropyl-2,6-naphthalenediol, 4,6 - dihydroxy-3-methyl-1-naphthalenemethanol, 6,7-dihydroxy-2-naphthalenepropanol, 4,8 - dihydroxy-2-naphthaleneacetic acid, 3,7-dihydroxy-alpha-methyl-1-naphthalenepropionic acid and the like.

Group C.—These flavotannins may be synthetic or naturally occurring such as those found in plants as gambier, catechu, quebracho, tizerah, urunday, wattle, mangrove, spruce, hemlock, larch, willow, avaram, Chinese rhubarb, guarana, mahogany, birch, wild cherry, horse chestnut, hotentot fig, iron wood, and teak. A particularly preferred flavotannin is quebracho which is obtained from the dried wood or bark, or dried extract of such wood or bark, of the aspidosperma quebracho branco or the quebracho lorentzi tree. Quebracho is readily available commercially.

Group D.—These gallotannins may be synthetic or naturally occurring such as sumac tannin and the tannins of valonia oak gall, tea, tara or carabin, valonia fruit cups and beard, myrabolam nuts, divi-divi pods, algarobilla pods, oak wood, bark, and leaves, chestnut wood, bark, and leaves, cloves, dhawa, guarana, mangue takaout, pomegranate, water lily, hornbeam, bistort, guayacan, and cascalote.

Group E.—The so-called mixed tannins are also applicable such as bablah, badan, Cyprus sumac, filao, maletto, and wandoo.

Many formations are preferentially oil wet due to the presence of naturally occurring surface active agents in the reservoir fluids, these agents being absorbed on the solid surface of formations. Minerals in other formations may exhibit a preferential wettability to the crude oil. Greatly increased oil recovery in a waterflooding operation can be obtained by causing a formation to become preferentially wet by the flood water rather than by the formation crude oil. I have discovered that this reversal of preferential wettability can be caused by the addition to the flooding water of at least one of the above described additives.

The additive of this invention to the flood water is present in the flood water in an amount in the range of 0.1 to 10, preferably 0.5 to 5 weight percent, although it is only necessary that an amount of additive be present sufficient to increase the permeability or water wettability of the formation.

The non-quinone additives of this invention other than the quinones and additives H, I and J are oxidizable to a quinoid structure. Quinones, as employed herein, refer to dioxo derivatives of dihydroaromatic systems, the oxygen atoms occupying positions which are ortho or para (or their equivalents in polycyclic compounds) to each other. A most generally applicable procedure for preparing a quinone is to start with a phenol or an amine, introduce either a hydroxyl or an amino group in an ortho or para position, and oxidize the intermediate in acid solution.

It is preferred that the pH of the waterflood containing the additive be controlled or adjusted to a range of 3 to 14, preferably 5 to 12, more preferably 7 to 12. Best results are generally attained when the pH of the flood water containing the additive is in the range of 9 to 12.

The pH of the solution may be adjusted by the addition of a base, e.g., an alkali metal hydroxide such as sodium hydroxide, or ammonium hydroxide or an alkali metal carbonate if the carbonate does not react with the mineral constituents of the reservoir.

It is sometimes helpful to include a reducing agent which will aid in solubilizing and maintaining the additive in solution, e.g., an alkali metal sulfite such as sodium sulfite, sodium bisulfite, sodium hydrosulfite or ammonium sulfite or sufur dioxide or the like. Although the mechanism is unknown it is believed that the reducing agent also assists in the inhibition of the polymerization of some of the polymerizable additives.

The reducing agent is employable in an amount in the range of 2 to 50 weight percent, preferably 5 to 20 weight percent, based on the additive.

In conjunction with the flood water containing the additive, it is also within the scope of the invention to use a solvent flood in advance of the waterflood. Steam or hot water is also employable. It is also in the scope of the invention to include a detergent or a wetting agent along with the additive of this invention. In some formations it may be necessary for the additive to be included only in the initial portion of the flood water so as to increase the permeability of an area adjacent the input well.

The word "water" as used in this specification and the appended claims is taken to include the various aqueous materials which are suitable for injection into an oil containing formation in secondary recovery waterflood processes and further includes aqueous solutions which may conveniently be disposed of by injection into a subterranean formation, such as saline waters.

Wettability, as referred to herein, refers to the Amott wettability measurement method [1] as modified by the inventor. A "fresh" core is prepared by canning the core in formation oil. When the cores are received in the laboratory, permeability plugs, 1.88 cm. (¾") in diameter by 3.5 cm. (1⅜") in length are drilled from the core parallel to the bedding plane. The drilling with a diamond bit, and the cutting off of the ends with a diamond saw are done with either the formation oil or formation water as a cutting fluid.

(1) The sample is placed in a 4 inch centrifuge tube with 1 inch of sand under the sample and ½ inch of sand above the sample. Formation water is added to saturate the sand to ½ inch from the top of the tube. The tube is capped and centrifuged at 33,000 gravities for 1 hour at 20° C. The sample core is then removed, washed with the water phase, placed in another centrifuge tube as above but with formation oil instead of formation water and recentrifuged as above. The core is removed, washed with oil phase, rolled on an oil dampened paper towel to remove excess oil and weighed immediately in a weighing bottle. This is weight A.

(2) The core is submerged in water phase for 24 hours, removed, washed with water phase, rolled on paper to remove excess water and weighed. This is weight B.

(3) Compute $I_w = B - A$.

(4) The core is centrifuged as before under water phase, removed, washed with water phase, rolled and weighed. This is weight C.

(5) Compute $T_w = C - A$ and $$R_{wo} = \frac{I_w}{T_w}, \quad 1 \geq R_{wo} \geq 0$$

(6) Step 2 is repeated substituting oil for water. This is weight D.

(7) Compute $I_o = C - D$.

(8) Repeat step 4 using oil instead of water. This is weight E.

(9) Compute $T_o = C - E$ $$R_{ow} = \frac{I_o}{T_o}, \quad 1 \geq R_{ow} \geq 0$$

(10) Compute wettability index
$$W = R_{wo} - R_{ow}, \quad -1 \leq W \leq +1$$

The wettability index of a completely oil wet sample is thus $-1$ whereas that of a completely water wet sample is $+1$.

The invention is best illustrated by the following examples.

EXAMPLE I

Permeability plugs cut from cores taken from wells in the North Burbank Unit sand having average wettabilities (W) of $-0.50$, $-0.45$, $-0.67$, $-0.49$ and $-0.56$ were flushed with distilled water to remove brine and restored with formation oil and water. The original wettability indices ($W_o$) of the individual plugs were determined with distilled water and NBU crude oil. The runs were then repeated using 2.5 gms. of the following additives in 250 cc. of water with sufficient NaOH to adjust the pH to 10. The results follow in Table I.

Table I

| Additive | $W_o$ (Avg.) | $W_{final}$ (Avg.) | $\Delta W$ |
|---|---|---|---|
| Pyrocatechol | −0.63 | −0.08 | +0.55 |
| p-Benzoquinone | −0.72 | −0.22 | +0.50 |
| Hydroquinone | −0.78 | −0.23 | +0.55 |
| Quinhydrone | −0.72 | −0.39 | +0.33 |

The above data prove the effectiveness of the additive for increasing water wettability of the formation.

EXAMPLE II

The effectiveness of quebracho at different pH levels and in the presence of $NaHSO_3$ was determined by dissolving 17.1 gms. of quebracho in 3 liters of NBU brine (½% sol.). This solution was divided into two 1500 ml. portions and 0.86 gm. of $NaHSO_3$ was added to one portion (10% of weight of quebracho). Each of the portions was divided into 3 parts and NaOH added to adjust the pH to 5, 7 and 9 in each of the following two sets.

---
[1] Earl Amott, "Observations Relating to the Wettability of Porous Rock," Trans AIME, 216 (1959).

Table II

| NaHSO₃ | pH | $W_o$ | $W_t$ | $\Delta W$ |
|---|---|---|---|---|
| Yes | 5 | −0.56 | −0.02 | +0.54 |
| No | 5 | −0.55 | −0.25 | +0.41 |
| Yes | 7 | −0.60 | −0.22 | +0.38 |
| No | 7 | −0.53 | −0.34 | +0.30 |
| Yes | 9 | −0.56 | −0.56 | 0 |
| No | 9 | −0.51 | −0.58 | −0.07 |

These results show that quebracho is more effective at a lower pH and in the presence of NaHSO₃.

EXAMPLE III

The effectiveness of quebracho at higher pH values and at higher concentrations was found to be as follows.

Table III

| Quebracho/distilled water | NaHSO₃/distilled H₂O | pH | $W_o$ | $W_t$ | $\Delta W$ |
|---|---|---|---|---|---|
| 100 gms./l | 10 mg./l | 10 | −0.62 | −0.11 | +0.51 |
| 30 gms./l | 3 gm./l | 11 | −0.48 | −0.04 | +0.44 |

EXAMPLE IV

Runs made on equimolar mixtures of p-benzoquinone and pyrocatechol at different total molarities and a pH of 10 produced wettability changes as follows.

Table IV

| Molarity | $W_o$ | $W_t$ | $\Delta W$ |
|---|---|---|---|
| 0.18 | −0.75 | −0.09 | +0.66 |
| 0.09 | −0.75 | −0.11 | +0.64 |

This indicates that mixtures of these additives are equally effective at different levels of concentration.

EXAMPLE V

A quinone forming naphthalenediol was compared to a non-quinone forming naphthalenediol at a pH of 10 with changes in wettability as follows.

Table V

| Additive | Molarity | $W_o$ | $W_t$ | $\Delta W$ |
|---|---|---|---|---|
| 1,3 naphthalenediol | 0.06 | −0.69 | −0.24 | +0.45 |
| 2,3 naphthalenediol | 0.06 | −0.70 | −0.34 | +0.36 |

EXAMPLE VI

The effectiveness of quebracho at different concentrations for increasing the oil recovery was as follows.

Table VI

| Quebracho, weight percent | Additional oil, BPAF [1] | Percent Improvement | $\Delta W$ |
|---|---|---|---|
| 2 | 156 | 16.3 | +0.35 |
| 1 | 157 | 16.4 | +0.38 |
| ½ | 119 | 12.4 | +0.27 |
| Control | 0 | 0 | 0 |
| 2+1 NaHSO₃ | 83 | 8.7 | 0.54 |

[1] Barrels per acre foot, calculated as discussed in Uren, "Petroleum Production Engineering, Oil Field Exploitation," McGraw-Hill Book Company, New York (9153), page 85.

In addition to the above, centrifuge tests with Burbank crude and fresh Burbank cores showed that the addition of 1 weight percent of bulk quebracho to simulated Burbank brine flood water reduces the average unrecovered residual oil content from 262 to 161 BPAF.

EXAMPLE VII

A number of additives were compared on Burbank cores as described in Example I at a concentration of 2 weight percent additive and with an adjusted pH of 9. The results are tabulated as follows. $W_o$ was about −0.50 in all samples.

Table VII

| Additive | $W_t$ | $\Delta W$ |
|---|---|---|
| Resorcinol | −0.44 | +0.06 |
| Pyrocatechol | +0.01 | +0.51 |
| Phloroglucinol | −0.38 | +0.12 |
| Pyrogallol | +0.02 | +0.52 |
| Hydroquinone | −0.05 | +0.45 |
| 1,7-naphthalenediol | −0.04 | +0.46 |
| 2,3-naphthalenediol | 0 | +0.50 |
| 2,6-naphthalenediol | −0.10 | +0.40 |
| Quinhydrone | −0.07 | +0.43 |
| Gallic acid | −0.04 | +0.46 |
| 1,5-naphthalenediol | −0.46 | +0.04 |
| 2,7-naphthalenediol | −0.48 | +0.02 |
| 1,8-anthradiol | −0.62 | −0.12 |
| 1,4,9,10-anthratetrol | −0.42 | +0.08 |
| p-Benzoquinone | −0.27 | +0.23 |
| 1-naphthol | −0.18 | +0.32 |
| 2-naphthol | −0.58 | −0.08 |
| 1,3-naphthalenediol | −0.08 | +0.42 |
| Phenol | −0.52 | −0.02 |
| Cresol | −0.49 | +0.01 |
| 2,5-dihydroxy-p-benzoquinone | −0.60 | −0.10 |
| o-Phenylphenol | −0.48 | +0.02 |
| 1,2-naphthoquinone | −0.56 | −0.06 |
| Anthraquinone | −0.62 | −0.12 |
| Trihydroxy-p-benzoquinone | −0.62 | −0.12 |
| 1,5-dihydroxyanthraquinone | −0.51 | −0.01 |
| 1,8-dihydroxyanthraquinone | −0.47 | +0.03 |
| 1,2,3-trihydroxyanthraquinone | −0.67 | −0.17 |
| 1,2,4-trihydroxyanthraquinone | −0.65 | −0.15 |
| 1,2,7-trihydroxyanthraquinone | −0.53 | −0.03 |
| 1,2,5,8-tetrahydroxyanthraquinone | −0.41 | +0.09 |
| 2-methylphloroglucinol | −0.32 | +0.18 |
| Tetramethyl-p-benzoquinone | −0.53 | −0.03 |

These examples indicate that a large number of additives which would appear to be chemically similar to those claimed are either inoperable or so ineffective as to be of little value commercially.

While certain examples, structures, composition and process steps have been described for purposes of illustration, the invention is not limited to these. Variation and modification within the scope of the disclosure and the claims can readily be effected by those skilled in the art.

I claim:

1. A process for the recovery of oil from a subterranean formation comprising injecting flood water into said formation through an input well, displacing oil in said formation, directing the displaced oil toward an output well and recovering said displaced oil from said output well, said flood water having present therein a compound selected from the group consisting of quebracho, pyrocatechol and hydroquinone in an amount sufficient to increase the water permeability of said formation.

2. The process of claim 1 wherein said amount is in the range of 0.01 to 10 weight percent based on flood water.

3. The process of claim 1 wherein said additive comprises quebracho.

4. The process of claim 1 wherein said additive comprises pyrocatechol.

5. The process of claim 1 wherein said additive comprises hydroquinone.

6. A process for the recovery of oil from a subterranean formation comprising injecting flood water into said formation through an input well, displacing oil in said formation, directing the displaced oil toward a producing well and recovering said displaced oil from said producing well wherein the formation is rendered preferentially oil-wet by injecting quebracho tannin with said flood water, said quebracho tannin being present in an amount in the range of 0.5 to 5.0 weight percent based on flood water and said mixture of quebracho tannin and floodwater having a pH in the range of 7 to 14.

References Cited by the Examiner

UNITED STATES PATENTS

| | | | |
|---|---|---|---|
| 2,246,726 | 6/1941 | Garrison | 252—8.55 |
| 2,738,325 | 3/1956 | Rydell | 166—9 |
| 2,831,022 | 4/1958 | Van Blaricom | 252—8.5 |

OTHER REFERENCES

Rogers: "Composition and Properties of Oil Well Drilling Fluids," Gulf Publishing Co., Houston, Texas, 1948, pages 290 to 295.

CHARLES E. O'CONNELL, *Primary Examiner.*

C. H. GOLD, T. A. ZALENSKI, *Assistant Examiners.*